United States Patent [19]

Moyer et al.

[11] Patent Number: 5,920,890
[45] Date of Patent: Jul. 6, 1999

[54] DISTRIBUTED TAG CACHE MEMORY SYSTEM AND METHOD FOR STORING DATA IN THE SAME

[75] Inventors: William C. Moyer, Dripping Springs; Lea Hwang Lee; John Arends, both of Austin, all of Tex.

[73] Assignee: Motorola, Inc., Schaumburg, Ill.

[21] Appl. No.: 08/748,856

[22] Filed: Nov. 14, 1996

[51] Int. Cl.$^6$ ..................................................... G06F 12/12
[52] U.S. Cl. ........................... 711/144; 711/145; 711/141
[58] Field of Search ..................................... 711/118, 144, 711/125, 117, 141, 145, 133

[56] References Cited

U.S. PATENT DOCUMENTS

| | | | |
|---|---|---|---|
| 4,763,253 | 8/1988 | Bluhm et al. | 395/383 |
| 5,222,224 | 6/1993 | Flynn et al. | 711/144 |
| 5,510,934 | 4/1996 | Brennan et al. | 711/119 |
| 5,511,178 | 4/1996 | Takeda et al. | 711/125 |

OTHER PUBLICATIONS

J. Bunda, "Instruction Processing Optimization Techniques for VLSI Microprocessors," PhD thesis Deptartment of Computer Science, Univ. of Texas, Austin, Chapter 7, May, 1993, pp. 95–114.

Ramesh Panwar and David Rennels, "Reducing the frequency of tag compares for low power I–cache design," 1995 Intl. Symposium on Low Power Design, Dana Point, CA, Apr., 1995, pp. 57–62.

J. Thornton, Design of a Computer: CDC 6600 Scot Foresman, Publisher: Glenview IL, 1970, pp. 12–15, 110–141, 173–175.

Andra Seznec, "Decoupled Sectored Caches: conciliating low tag implementation cost and low miss ratio," Proc IEEE 21st Intl. Symposium on Computer Architecture, Jun. 1994, pp. 384 –392.

Ching–Long Su and Alvin M. Despain, "Cache Designs for Energy Efficiency," 28th Hawaii International Conf. on System Sciences, Jan. 1995.

Dake Liu and Christer Svensson, "Power Consumption Estimation in CMOS VLSI Chips," Journal of Solid State Circuits, vol. 29, No. 6, Jun. 1994, pp. 663–670,.

Ching–Long Su and Alvin M. Despain, "Cache Design Trade–offs for Power and Performance Optimization: A Case Study," 1995 Intl. Symp. Low Power Design, Dana Point, CA, pp. 63–68.

Kiyoo Itoh, Katsuro Sasaki, and Yoshinobu Nakagone, "Trends in Low–Power RAM Circuit Technologies," '94 Symp. on Low Electronics, San Diego, CA, Oct. 1994, pp. 84–87.

John Bunda, W. C. Athas and Don Fussell, "Evaluating Power Implications of CMOS Microprocessor Design Decisions," Intl Workshop on Low Power Design, Napa Valley, CA, Apr., 1994, pp.. 147–152.

*Primary Examiner*—John W. Cabeca
*Assistant Examiner*—J. Peikari
*Attorney, Agent, or Firm*—Patricia S. Goddard; Daniel D. Hill

[57] ABSTRACT

A loop cache (26) is used in a data processing system for supplying instructions to a CPU to avoid accessing a main memory. Whether instructions stored in the loop cache can be supplied to the CPU is determined by a distributed TAG associated with the instruction address computed by the CPU. The instruction address includes an LCACHE index portion (42), an ITAG portion (44), and a GTAG (46). LCACHE index (42) selects corresponding locations in each of an ITAG array (50), an instruction array (52), and a valid bit array (54). A stored GTAG value (48) is chosen irrespective of where LCACHE index (42) is pointing. The GTAG portion of the instruction address (40) is compared to the stored GTAG value (48). The ITAG portion (44) of instruction address (40) is compared with the indexed ITAG of the ITAG array (50). If both the GTAG and ITAG compare favorably, the instruction is supplied from the loop cache to the CPU, rather than from main memory.

22 Claims, 6 Drawing Sheets

DISTRIBUTED TAG CACHE MEMORY SYSTEM AND METHOD FOR STORING DATA IN THE SAME

CROSS REFERENCE TO RELATED APPLICATION

The present application is related to a commonly assinged, co-pending application entited, "DATA PROCESSING SYSTEM HAVING A CACHE AND METHOD THEREFOR," by Moyer et al. Attorney Docket No. SC90333A, filed concurrently herewith.

FIELD OF THE INVENTION

The present invention relates to memory systems in general, and more particularly to cache memory systems for storing instructions to be executed by a central processing unit.

BACKGROUND OF THE INVENTION

Low power design has been gaining importance in microprocessor design due to wide spread use of portable and handheld applications. Many portable and embedded microprocessors consume a significant amount of energy for accessing memory. Power consumed by instruction references, in a typical microprocessor, is much higher than the power consumed by data references. Thus, reducing instruction fetch energy can be beneficial in such applications.

Applications such as paging, fax, and digitial signal processing often spend a significant portion of their execution time on small program loops. Having to repeatedly access a main memory for these instructions results will have an unwanted impact upon power consumption and execution speed. Therefore, it is desirable to reduce energy consumption and increase execution speed associated with the execution of such small loops by avoiding the need to access main memory.

A cache TAG is frequently used to increase the performance of the cache. The cache TAG receives a TAG address that is provided by the microprocessor and determines if the requested instructions and/or data are present in the cache memory. If a requested instruction is not located in the cache, the microprocessor must then retrieve the instruction from the main memory. When an instruction is written into the cache, the higher order bits of the address of the instruction are stored in a TAG array. The cache TAG also has a comparator that compares a processor generated address to the TAG address. If the TAG address and the processor generated address are the same, a cache "hit" occurs, and a match signal is provided by the cache TAG, indicating that the requested data is located in the cache memory. If the processor generated address and the TAG address are not the same, a cache "miss" occurs, and the match signal indicates that the requested data is not located in the cache memory. In addition, a valid bit may be set as a part of the TAG address for qualifying a valid hit of the stored TAG address during a compare cycle of the cache.

In a conventional TAG array, each instruction entry of the cache has a corresponding TAG array entry, with each TAG array entry being of a same size. Accordingly, the size of a conventional TAG array can be quite large, particularly if the cache itself is large. To reduce the size of the TAG array, one typically has to use a smaller cache. However, there are many applications, particularly embedded controller applications, where a sufficiently large cache would be highly desirable to enable fast execution of repeated instruction loops with low power consumption. In these same applications, it is desirable to keep the size of the integrated circuit as small as possible. Therefore, it would be desirable to accomplish similar objectives as are achieved with a conventional TAG array, while at the same time minimizing the overall size of the integrated circuit without a significant reduction in the cache size.

DESCRIPTION OF A PREFERRED EMBODIMENT

Generally, the present invention is a cache memory system which employs a loop cache local to a central processing unit (CPU) for storing a plurality of instructions to be repeatedly executed, without having to access a main memory of a data processing system. A single global tag value is used in determining a hit or miss status of the loop cache, in conjunction with an individual tag portion associated with each entry of the loop cache. Invalidating entries of the loop cache is governed by comparison logic of the global and individual tags, and by detection of a change-of-flow condition. A state machine is used to assist in a replacement operation for the loop cache entries. The present invention can be more fully understood with reference to FIGS. 1–8 and the text below.

Figure 1:
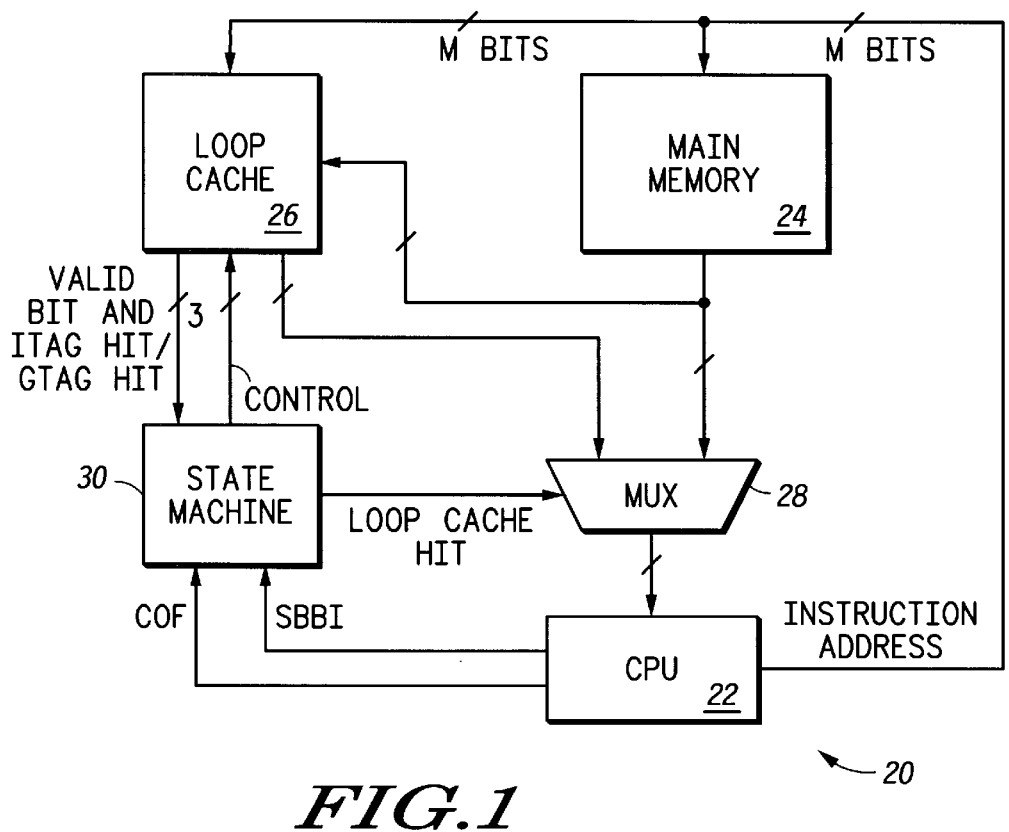
FIG. 1 illustrates, in block diagram form, a data processing system including a memory portion in accordance with the present invention.

FIG. 1 illustrates, in block diagram form, a data processing system 20 in accordance with the present invention. Data processing system 20 includes central processing unit (CPU) 22, main memory 24, loop cache 26, multiplexer 28, and state machine 30. Generally, CPU 22 generates a plurality of instruction addresses for instructions to be subsequently executed by the CPU. The instruction addresses are provided to main memory 24 and loop cache 26. Each instruction address comprises M bits. All M bits are provided to both the loop cache 26 and main memory 24. In response to the instruction address, the main memory 24 or the loop cache 26 provides instructions corresponding to the instruction address to the CPU via multiplexer 28. State machine 30, in conjunction with logic associated with loop cache 26, is used to control which of the main memory 24 or loop cache 26 is to provide instructions to CPU 22. Note that in other embodiments, loop cache 26 may supply instructions to, for example, an alternate data processing or storage unit instead of to CPU 22.

State machine 30 receives control signal labeled "COF" (change-of-flow) and a control signal labeled "SBBI" (short backward branch instruction). Loop cache 26 provides three control bits to state machine 30. One of the control bits is labeled "GTAG HIT," another is labeled "ITAG HIT," and the other control bit is labeled "VALID BIT". As illustrated, a "LOOP CACHE HIT" signal is supplied to the multiplexer 28 by state machine 30. LOOP CACHE HIT is a function of GTAG HIT, ITAG HIT and VALID BIT, as described below. When LOOP CACHE HIT is asserted, loop cache 26 is active and data can be read from loop cache 26 and supplied to CPU 22 via multiplexer 28. When LOOP CACHE HIT is negated, loop cache 26 is inactive and data is instead provided from main memory 24 to CPU 22 via multiplexer 28. At the same time as data, such as an instruction, is being supplied to CPU 22 from main memory 24, such data can be provided from main memory 24 to loop cache 26. The manner in which loop cache 26 functions will be described later with reference to FIGS. 2–8.

Figure 2:
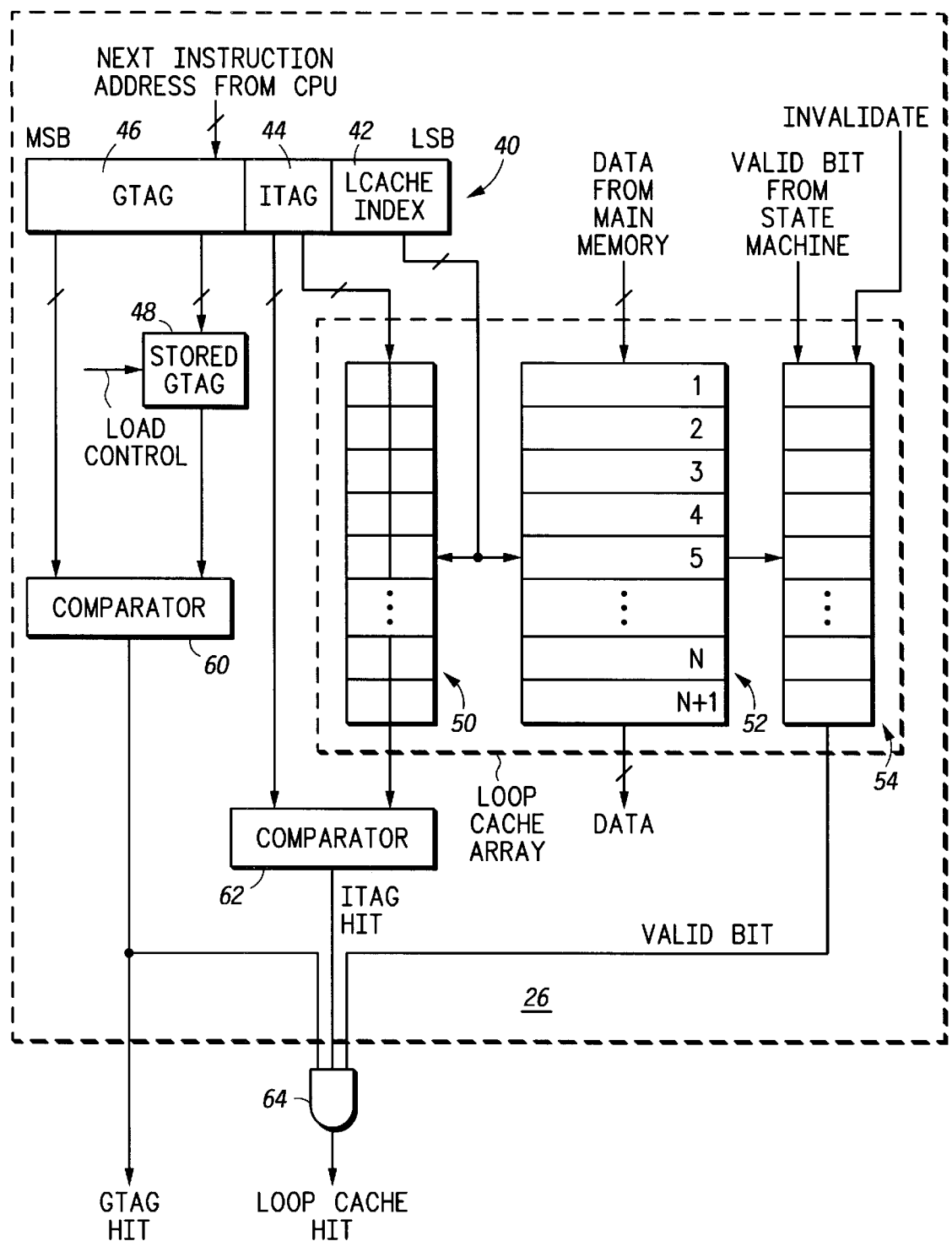
FIG. 2 illustrates, in block diagram form, the memory system used in the data processing system of FIG. 1, also in accordance with the present invention.

Loop cache 26 is illustrated in more detail in FIG. 2. A next instruction address is received from CPU 22 into an instruction address 40. Instruction address 40 includes a loop cache (LCACHE) index portion 42, an individual tag (ITAG) portion 44, and a global tag (GTAG) portion 46. LCACHE index 42 is used to address a location within ITAG array 50, within instruction array 52, and within a valid bit array 54. ITAG portion 44 is loaded into an entry of ITAG array 50 which is selected by the LCACHE index 42. The ITAG portion of the instruction address is also coupled to a comparator 62 for comparing the value in the ITAG portion of the instruction address with the ITAG value stored in the entry of ITAG array 50 selected by LCACHE index 42. GTAG portion 46 is used to load a GTAG value as a stored GTAG value 48. GTAG portion 46 is also coupled to a comparator 60 for comparing the GTAG portion of the instruction index with the stored GTAG value 48.

Valid bit array 54 includes a plurality of entries associated with the entries of instruction array 52. A valid bit array is updated or maintained from state machine 30. Every time a new entry is loaded into the instruction array, its associated valid bit is set equal to 1. ITAG array 50 also includes a plurality of entries associate with the entries of instruction array 52, such that each instruction entry has its own unique ITAG entry. The ITAG entry serves to "tag" each instruction as in conventional tag arrays. However, the present invention achieves a tag function without the tag portion being the same size as the instruction address. Thus, the tag array is of significantly smaller size than conventional tag arrays. In accordance with the present invention, use of a single global tag value that is common to multiple instruction entries enables the use of a smaller ITAG array.

It is noted that the number of entries in the loop cache is not limited by the present invention. An optimal size would be governed by the particular application for the data processing system (e.g. being dependent on the average size of instruction loops for that appplication). Furthermore, the number of bytes in each ITAG array entry is not restricted by the invention. The more bytes, the larger the physical size of the array. However, the fewer the number of bytes, the more likely a loop cache instruction cannot be used and a main memory will have to be accessed. Factors in determining the number of bytes in the entries of the ITAG array will likely depend upon on the type of program being run in the data processing system. One example of a configuration of an ITAG array is as follows. For a instruction address of 32 bits, and a 16 entry, single instruction loop cache, bit 0 of the address is irrelevant, while bit 1 through bit 4 (for a total of 4 bits) are used as the LCACHE index portion 42, and bit 5 and bit 6 (for a total of 2 bits) are used for the ITAG portion 44, leaving bits 6–31 (for a total of 25 bits) for the global tag portion 46.

Cache hit logic 64 is coupled to comparator 60, comparator 62 and valid bit array 54. Cache hit logic 64 will indicate a cache hit if 1) GTAG portion 46 of instruction address 40 matches the stored GTAG value 48, and 2) ITAG portion 44 of instruction address 40 matches the ITAG portion entry selected by loop cache index 42, and 3) the valid bit of valid bit array 54 also selected by LCACHE index 42 is asserted. In a preferred embodiment, comparator 60 also provides a GTAG hit signal indicating the result of the comparison between GTAG portion 46 of the instruction address with the stored GTAG value 48.

Figure 3:
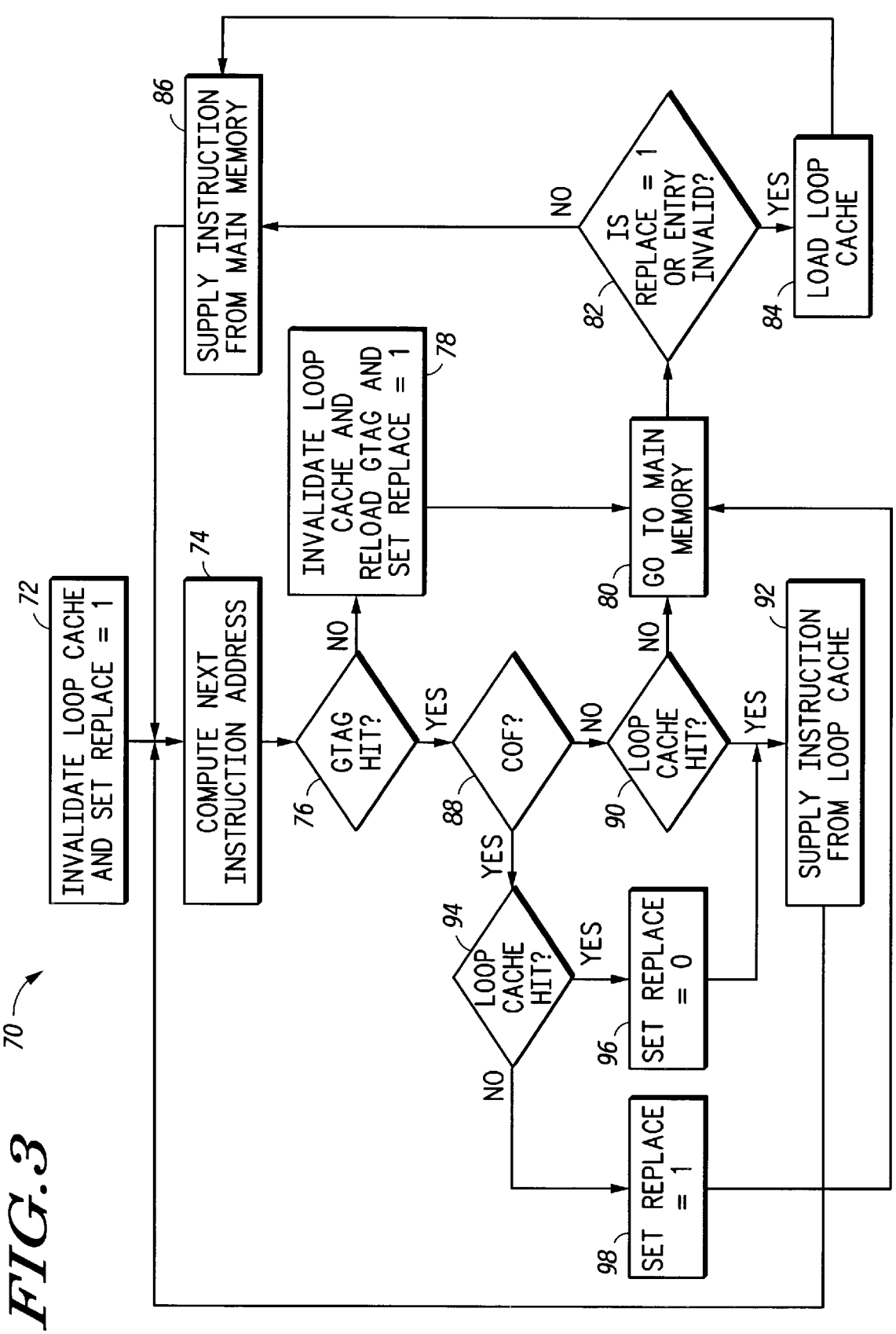
FIG. 3 illustrates in a flow diagram a process for storing, using, and replacing data in the loop cache of the memory system illustrated in FIG. 2.

FIG. 3 illustrates, in flow diagram form, a process 70 for storing, using, and replacing instructions associated with loop cache 26 in accordance with one embodiment of the present invention. In a first step of the process, step 72, all entries of the valid bit array are invalidated, or set to zero and a state variable called, "REPLACE" is set equal to one. The state variable REPLACE determines whether an instruction from main memory is to loaded into the loop cache, thereby replacing an existing entry. In a next step 74, the CPU computes a next instruction address, shown in FIG. 2 as instruction address 40. In a step 76, a decision was made to whether there is a GTAG hit, in other words whether the GTAG portion 46 of instruction address 40 matches stored GTAG value 48. If there is not a GTAG hit, the loop cache is invalidated in a step 78, and the stored GTAG value is replaced with the value of GTAG portion 46 of the instruction address. In step 78 of FIG. 3, this is indicated as, "reload GTAG." Also within step 78, the state variable REPLACE is again set equal to 1. Because there has not been a GTAG hit, the instruction stored within the indexed loop cache entry cannot be used and an instruction must be fetched from main memory. This is indicated in process 70 as a step 80. In a decision step 82, it is next determined if either REPLACE equals 1, or the entry is invalid (i.e. the valid bit indexed by LCACHE index 42 of instruction address 40 is negated or set to zero). If either one of these two conditions occur, the instruction array entry selected by LCACHE index 42 is loaded with the instruction received from main memory in a step 84, and the entry is validated (i.e. the valid bit associated with the entry is set equal to 1). The same instruction is then supplied to the CPU in a step 86. A next instruction address is then computed and received in step 74, and process 70 continues.

If in decision step 76 the result is that there is a GTAG hit, a next step in process 70 is a decision step 88 to determine whether there has been a change-of-flow (COF). A COF signal is asserted by the CPU the instruction address does not follow in sequence from an immediately previous received instruction address. Thus, a change-of-flow is analagous to a taken branch. If there has not been a change-of-flow, a next step is to determine whether there has been a loop cache hit, as indicated by a decision step 90. As previously described, there is a loop cache hit signal output from cache hit logic 64 when both the GTAG and ITAG portions of the instruction address match a stored GTAG value and a selected ITAG array entry, respectively, and when a selected entry of the valid bit array shows that the entry is valid. If these conditions are met, there is a loop cache hit, and the instruction stored within the entry of the instruction array selected by LCACHE index 42 of the instruction address 40 is supplied from the loop cache to the CPU in a step 92. There is no need to access the main memory for the instruction, thereby saving power consumption and execution speed. The next instruction address is then computed by the CPU in step 74, and process 70 repeats.

If instead it is determined that there is a change-of-flow in step 88, a couple of things need to be determined. First, it must be determined whether the state variable REPLACE should be set to 1 or 0, thereby affecting whether the entry of the instruction array selected by LCACHE index 42 of instruction address 40 is to be loaded with a new instruction from main memory. It must also be determined whether the selected entry of the instruction array is to be supplied to the CPU. These determinations are made in process 70 as follows. If there is a change in flow in step 88, it is next determined whether there has been a loop cache hit in a decision step 94. Step 94 is analguous to step 90 as previously described above. If there is a loop cache hit, the state variable REPLACE is set to 0 in a step 96, meaning that the selected entry of the instruction array will not be replaced by a new instruction from main memory. Instead, the instruction stored in the selected entry of the instruction array is supplied to the CPU in step 92. The next instruction address is then computed by the CPU in step 74 and process 70 continues.

If there has been a change-of-flow in step 88, but there is not a loop cache hit, the state variable REPLACE is then set to 1 in a step 98. Because there is not a loop cache hit, the instruction must be fetched from main memory in step 80. In step 82 it is then determined whether REPLACE equals 1 or the entry is invalid. Because REPLACE was set equal to 1 in step 98, the result of step 82 will be "YES" and the instruction fetched from main memory will be loaded into the entry of the instruction array indexed by the instruction address in step 84. The instruction from the address in main memory is then supplied to the CPU in step 86, and the next instruction address is computed by the CPU in step 74. Process 70 then repeats. It is noted that process 70 continues as long as the CPU supplies instruction addresses. These instruction addresses will be supplied by the CPU for as long as CPU is executing instructions.

With process 70, a loop cached can be used to supply a loop of repeated instructions to the CPU, thereby bypassing the main memory during repeated execution of these instructions. Whether the instructions stored in the loop cache are the ones the CPU is requesting is determined by the use of a small individual tag, unique to each entry of the loop cache, and a global tag, common to multiple entries. By representing the most significant bits (MSBs) of an instruction address with a single global tag value or field, the size of the tag array is kept very small while achieving all other benefits of a local cache.

Figure 4:
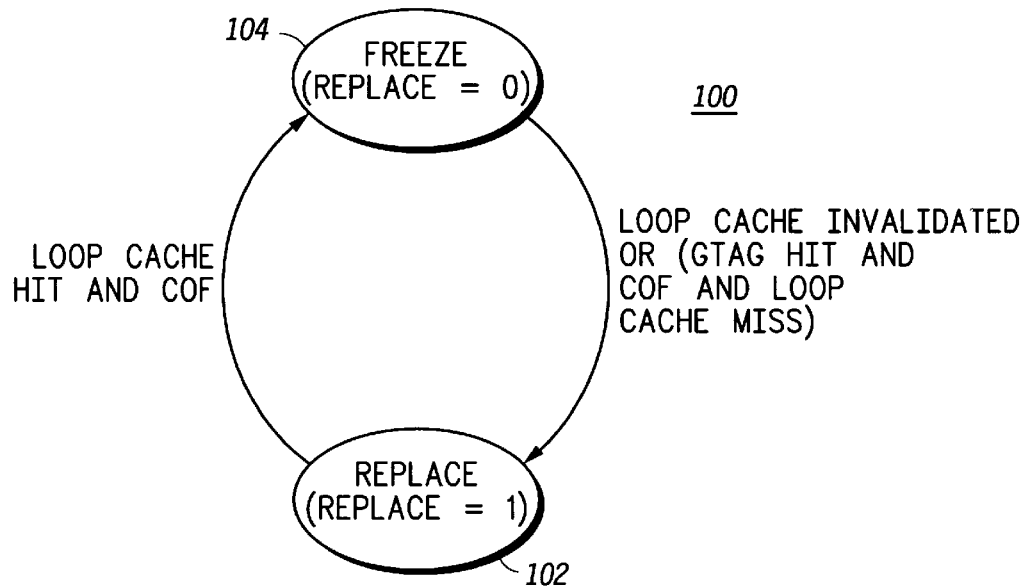
FIG. 4 illustrates a state machine which controls whether an entry in the loop cache is to be replaced.

FIG. 4 illustrates a state machine 100 having a REPLACE state 102 and a FREEZE state 104. REPLACE state 102 is analgous to when the REPLACE bit is set equal to 1, while the FREEZE state represents when REPLACE is equal to 0. As indicated by the state machine, a state variable changes from REPLACE to FREEZE when there is both a loop cache hit and a change-of-flow. From the FREEZE state, the state variable is changed to REPLACE upon the occurrence of one of two conditions; 1) either the loop cache has been invalidated, or 2) there is a GTAG hit, a change-of-flow, and a loop cache miss.

Figure 5:
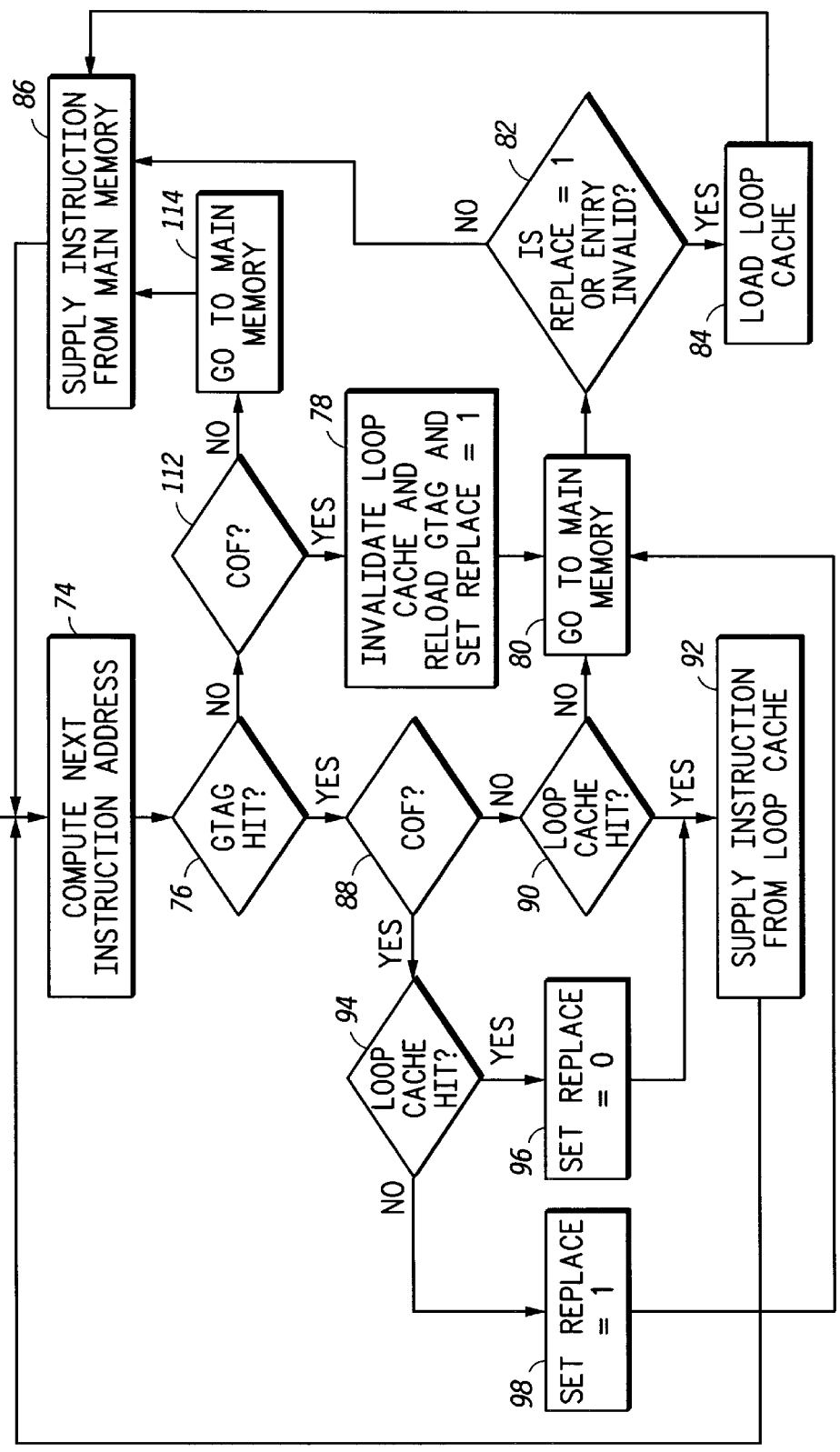
FIG. 5 illustrates, in flow diagram form, an enhancement to the method described and illustrated in FIG. 3.

FIG. 5 illustrates in another flow diagram, a process 110 for using a loop cache in accordance with another embodiment of the present invention. Process 110 includes many of the same steps and flow as was previously described in reference to process 70 of FIG. 3. Accordingly, a description of common steps or analgous flow will be omitted in reference to describing process 110. Process 110 differs from process flow 70 when the result of decision step 76 is "NO" (i.e. there is not a GTAG hit). As illustrated in FIG. 5, if there is not a GTAG hit in step 76, a next step 112 of process 110 is to determine whether there has been a change-of-flow. Step 112 is analgous to step 88 previously described. If the instruction address received from the CPU was a change-of-flow in comparison to immediately preceding instruction addresses, the loop cache is invalidated in step 78. The stored GTAG value is reset, and the state variable REPLACE is set equal to 1. Since there was a GTAG miss with a change-of-flow, the instruction must be set fetched from main memory in step 80. The instruction is loaded into the selected entry of the loop cache in step 84 because REPLACE is equal to 1 in decision step 82. The instruction fetched from the main memory is then supplied to the CPU and a next instruction address is computed.

If instead there is a GTAG miss without a change-of-flow from the previously received instruction address, the instruction is fetched from main memory, and this instruction is supplied to CPU, rather than the instruction that is present within the selected loop cache entry.

Figure 6:
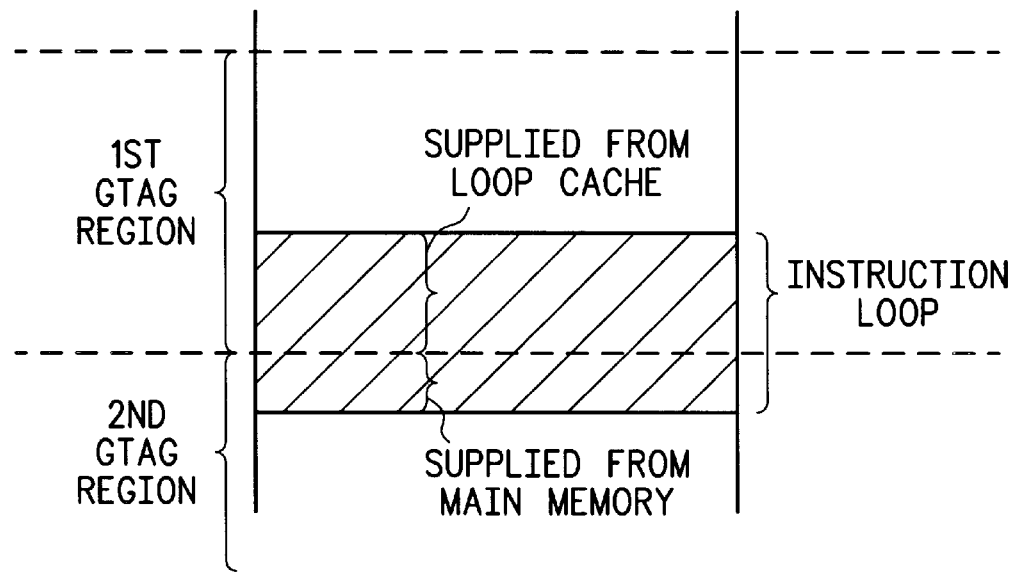
FIG. 6 illustrates a portion of instruction address values stored in memory, wherein a loop of instructions cross over a GTAG region boundary, as used in the present invention, but it is desirable not to reload the loop cache, in accordance with the process of FIG. 5.

The benefit of adding step 112 may be better understood in reference to FIG. 6. FIG. 6 represents a portion of addresses in memory associated with a particular GTAG region. A GTAG region is a region of memory which corresponds to the same stored GTAG value. As shown in FIG. 6, the particular loop being executed by the CPU contains addresses which cross two different GTAG regions. Nonetheless, it may be beneficial to execute the instructions from at least a portion of that loop from the loop cache as opposed to supplying these instructions from main memory. Accordingly, with the implementation of process flow 110, if there is a GTAG miss but not a change-of-flow from the previously computed instruction address, the instruction is supplied from main memory continually until there is either a GTAG hit or a change-of-flow. Accordingly, at least a portion of the instructions within the loop can still be supplied from the loop cache for energy conservation and speed efficiency.

Figure 7:
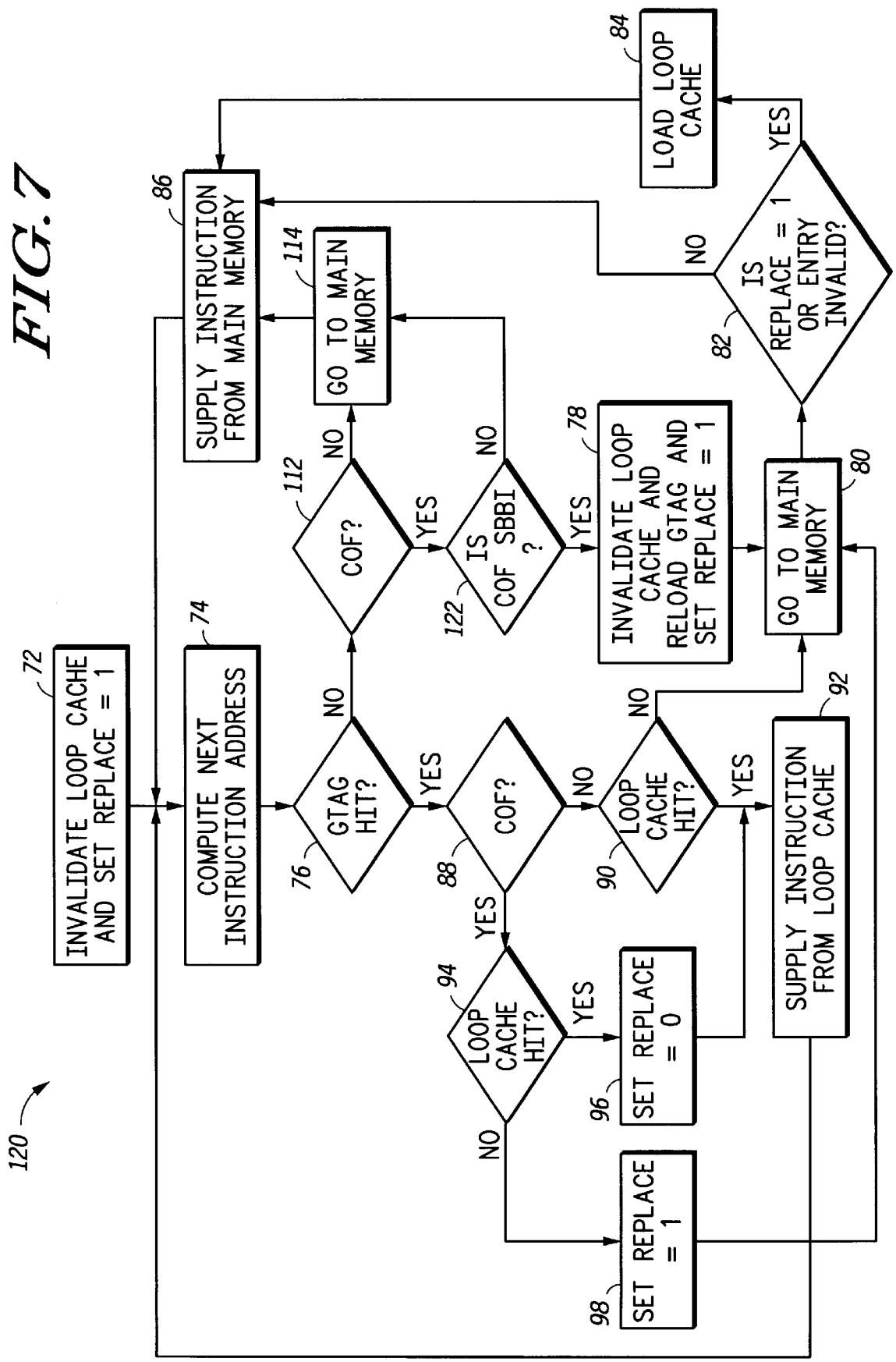
FIG. 7 illustrates, in flow diagram form, a further enhancement in the method described and illustrated in FIG. 5.

FIG. 7 illustrates a process flow 120 also in accordance with the present invention for utilizing a loop cache. Again, many of the steps and flows are analgous to that previously described in reference to flow 70 of FIG. 3, and thus will not be repeated. Like process 110, process 120 differs from process 70 with respect to steps performed when there is a GTAG miss (in other words when the result of decision step 76 is "NO"). If there is a GTAG miss at step 76, step 112 is performed as previously described to determine if there has been a change-of-flow. If there is not a change-of-flow, an instruction is fetched from main memory in step 114. This instruction is supplied to the CPU from the main memory in step 86, and the CPU computes the next instruction address in step 74. The benefit of going to main memory rather invalidating entries of the loop cache when there is not a change-of-flow is the same as that described in reference to process 110.

The enhancement provided by process 120 is what occurs if there is a change-of-flow at step 112. If the result of decision step 112 is "YES," another decision step 122 is used to determined whether the change-of-flow was the result of a short backward branch instruction (SBBI). An SBBI signal is asserted by the CPU when a branch instruction has been executed which branches back to an instruction within a predetermined displacement from the previous instruction. The purpose of creating a SBBI signal is to indicate whether a particular instruction loop is of a small enough size to fit within the loop cache. In decision step 122, if the change-of-flow is not an SBBI, the instruction is fetched from main memory in step 114, and that instruction is supplied to CPU from main memory just as if there had been no change-of-flow. If on the other hand, the change-of-flow is an SBBI, the loop cache is invalidated in step 78. In this same step, a new GTAG value is loaded and the state variable REPLACE is set equal to 1. An instruction is then fetched from main memory in step 80, and the loop cache is loaded with this instruction in step 84, since REPLACE equals 1. The instruction is then supplied to the CPU from main memory and the CPU computes its next instruction address in 74 and process 120 continues.

Figure 8:
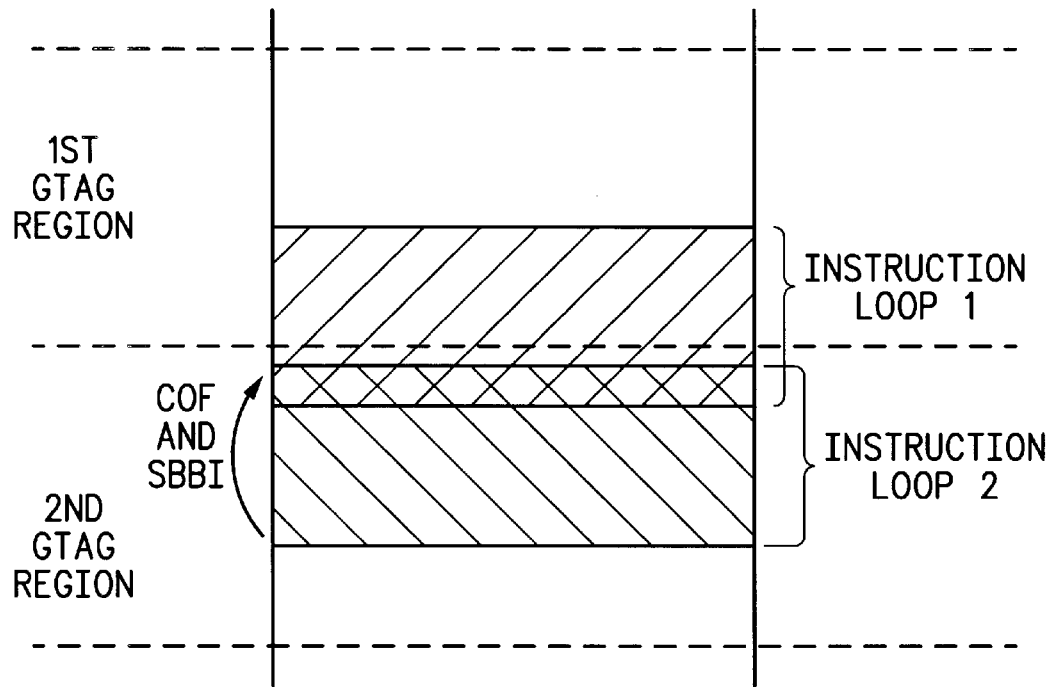
FIG. 8 illustrates a portion of instruction address values stored in memory, wherein a first loop of instructions cross over a GTAG region boundary, but a second, subsequent loop of instructions falls within a single GTAG region and is of small enough size to be loaded into the loop cache, in accordance with the process of FIG. 6.

The benefit of adding decision step 122 in process 120 when there is a change-of-flow is represented in FIG. 8. FIG. 8, like FIG. 6, represents two distinct GTAG regions. If the CPU is computing instruction addresses associated with an instruction loop 1, upon crossing first GTAG region into second GTAG region, the result of step 76 will be "NO" (i.e. there is a GTAG miss). Still within instruction loop 1, there will not be a change of flow and the portion of instruction loop 1 existing within the second GTAG region will continue to be supplied from main memory, while the portion of instruction loop 1 falling within the first GTAG region will be supplied by the loop cache as previously described in reference to FIG. 6. By adding decision step 122, one is able to capture a new instruction loop within the loop cache. For example in FIG. 8, an instruction loop 2 is being executed wherein upon executing the last instruction from loop 2, there is a change-of-flow or branch back which falls within a predetermined displacement from the last instruction of the loop. In such an instance, it would be desirable to invalidate the entries of the loop cache, and reload it with the instructions associated with instruction loop 2, rather than maintaining only a portion of instruction loop 1 within the cache memory. In other words, the loop cache picks up on the fact that a new loop of instructions is being executed by the CPU, and that it would be more efficient to store this loop of instructions in the instruction array of the loop cache rather than storing only a portion of a loop in the loop cache and relying upon main memory to supply the remaining portion of a loop. It is noted that while in FIG. 8 instruction loop 1 and instruction loop 2 are shown to have overlapping instruction addresses, such as not a requirement to achieve the benefit performing the processing described in reference to FIG. 8.

From the foregoing it is apparent that there has been provided a distributed tag cache memory system in a method for storing data into the same which fulfills the need set forth previously. More particularly, it has been shown that the use of a stored global tag value (which is not chosen from an instruction address cache index) in conjunction with an ITAG value (which is selected by the cache index of the instruction address) provides a means of utilizing a loop cache for supplying instructions to a CPU. Use of such a loop cache reduces the power consumed by fetching instructions, by reducing the number of accesses of a main memory. Avoiding such main memory accesses can further improve execution speed of the CPU. The use of a loop cache as taught herein is particularly useful in applications which rely heavily upon the execution of small instruction loops. Such applications include digital signal processing, paging, and fax applications. Use of a loop cache in accordance with the present invention is accomplished with minimal area implications since a single global tag value is used for multiple loop cache entries.

While the invention has been described in the context of a preferred embodiment or embodiments, it will be apparent to those skilled in the art that the present invention may be modified and may assume embodiments other than those specifically set forth above. For example, the main memory of the present invention can be any type of memory array at a higher level than the loop cache, such as an L2 cache or even external memory. Furthermore, the present invention is not limited to any particular number of entries in the loop cache array or the number of bytes therein. Nor is the invention limited to use with a single global tag value or field. A few global tag values can be stored simultaneously while still reaping the benefits herein described. Accordingly, it is intended by the appended claims to cover all modifications of the invention which fall within the true spirit and scope of the invention.

What is claimed is:

1. A cache memory system comprising:
   a cache array having a plurality of entries, each entry having an individual tag portion and a data portion;
   storage means for storing only a single global tag value;
   an instruction address input coupled to the cache array and to the storage means, the instruction address input having an index portion and a tag portion, wherein the index portion identifies one of the plurality of entries of the cache array without identifying the global tag value, and wherein the tag portion is partitioned into an individual tag portion and a global tag portion;
   comparison means coupled to the storage means, the cache array, and the instruction address input for comparing the individual tag portion of an identified cache array entry with the individual tag portion of the instruction address input and for comparing the global tag value with the global tag portion of the instruction address input; and
   a state machine, coupled to the comparison means and to the cache array, for causing the cache array to be loaded with a plurality of instructions that are to be repeatedly executed in response to detecting both a favorable comparison of the global tag value and the global tag portion and a change-of-flow signal from a central processing unit.

2. The cache memory system of claim 1 wherein the cache array is a loop cache array.

3. The cache memory system of claim 1 wherein each entry of the cache array further comprises a validity indicator.

4. The cache memory system of claim 1 wherein the comparison means includes a first output which indicates a result of a comparison of the individual tag portion of an identified cache array entry with the individual tag portion of the instruction address input, and a second output which indicates a result of a comparison of the global tag value with the global tag portion of the instruction address input.

5. The cache memory system of claim 1 wherein the comparison means includes a first output which indicates a combining of a first result of a comparison of the global tag value with the global tag portion of the instruction address input and a second result of a comparison of the individual tag portion of an identified cache array entry with the individual tag portion of the instruction address input.

6. The cache memory system of claim 5 wherein the comparison means further includes a second output corresponding to the first result.

7. The cache memory system of claim 5 wherein each entry of the cache array further comprises a validity indicator and wherein the first output indicates a combining of the first result, the second result, and the validity indicator of a selected cache entry.

8. A data processing and memory system, comprising:
a central processing unit for generating instruction addresses and for processing instructions, one of the instructions corresponding to one of the instruction addresses;
a main memory, coupled to the central processing unit, for supplying and receiving data;
a cache memory, coupled to the central processing unit and to the main memory, for receiving and supplying the instructions; and
a state machine, coupled to the central processing unit and to the cache memory, for causing the cache memory to be loaded with a plurality of instructions that comprise an instruction loop to be iteratively executed by the central processing unit, the plurality of instructions are loaded in response to detecting that one instruction executed by the central processing unit is a short backward branch instruction, wherein the short backward branch instruction is for indicating that the instruction loop will fit within the cache memory.

9. The data processing and memory system of claim 8 wherein the state machine is further characterized for causing the cache memory to be active and supplying an instruction to the central processing unit in response to a validity value corresponding to the instruction being valid.

10. The data processing and memory system of claim 8, wherein the central processing unit provides a first control signal to the state machine in response to determining whether an instruction address is a sequential instruction address in a series of instruction addresses.

11. The data processing system of claim 10, wherein the central processing unit provides a second control signal to the state machine in response to detecting an instruction which causes a short backward branch in the series of instruction addresses, the second control signal being active when a displacement of the short backward branch is less than a predetermined displacement.

12. A method for storing data in a cache memory system comprising the steps of:
providing a cache array having a plurality of entries, each entry having an individual tag portion and a data portion;
receiving an instruction address having an index portion, an individual tag portion, and a global tag portion;
selecting an entry of the plurality of entries of the cache array based upon the index portion of the instruction address;
storing a global tag value in memory, wherein the global tag value is stored independently of the index portion of the instruction address;
comparing the global tag portion of the instruction address with the global tag value stored in memory;
comparing the individual tag portion of the instruction address with the individual tag portion of a selected entry of the cache array;
determining if the entry selected is valid;
determining a cache hit in response to the steps of comparing the global tag portion of the instruction address with a global tag value stored in memory, comparing the individual tag portion of the instruction address with the individual tag portion of a selected entry of the cache array, and determining if the entry selected is valid;
selectively supplying the data portion of the selected entry in response to the step of determining the cache hit;
detecting that an instruction in a sequence of instructions is for causing a short backward branch of within a predetermined displacement from the detected instruction to define an instruction loop that is iteratively executed; and
storing the instruction loop into the cache array.

13. The method of claim 12 wherein the step of storing a global tag value comprises storing a single global tag value.

14. The method of claim 12 further comprising the steps of:
determining a change-of-flow based upon whether the instruction address follows in sequence from a previously received instruction address; and
modifying a state variable in response to the step of determining a cache hit and the step of determining a change-of-flow.

15. The method of claim 14 further comprising the step of:
selectively updating the entry of the cache array based upon a value of the state variable.

16. The method of claim 12 further comprising the step of:
selectively updating the entry of the cache array based upon the step of determining if the entry selected is valid.

17. The method of claim 12 further comprising the step of:
conditionally invalidating the plurality of entries of the cache array in response to the step of comparing the global tag portion of the instruction address with the global tag value stored in memory.

18. The method of claim 17 further comprising the step of:
conditionally storing a new global tag value in memory in response to the step of comparing the global tag portion of the instruction address with the global tag value stored in memory.

19. The method of claim 18 further comprising the step of:
determining a change-of-flow based upon whether the instruction address follows in sequence from a previously received instruction address; and
wherein the step of conditionally storing a new global tag value is performed also in response to the step of determining the change-of-flow.

20. The method of claim 19 wherein the step of determining a change-of-flow comprises determining a short change-of-flow based upon whether the instruction address follows in sequence from a previously received instruction address and whether the instruction address falls within a predetermined displacement from the previously received instruction address.

21. The method of claim 17 further comprising the step of:
determining a change-of-flow based upon whether the instruction address follows in sequence from a previously received instruction address; and
wherein the step of conditionally invalidating the plurality of entries of the cache array is performed also in response to the step of determining the change-of-flow.

22. The method of claim 21 wherein the step of determining a change-of-flow comprises determining a short change-of-flow based upon whether the instruction address follows in sequence from a previously received instruction address and whether the instruction address falls within a predetermined displacement from the previously received instruction address.

* * * * *